United States Patent [19]

Smith et al.

[11] 4,115,046
[45] Sep. 19, 1978

[54] PROBE INJECTION SYSTEM FOR A TIRE CURING PROCESS

[75] Inventors: Thomas W. Smith, Fort Myers Beach, Fla.; Jeffrey N. Bibbee, Mogadore, Ohio

[73] Assignee: McNeil Corporation, Akron, Ohio

[21] Appl. No.: 835,646

[22] Filed: Sep. 22, 1977

[51] Int. Cl.² .............................................. B29H 5/02
[52] U.S. Cl. ...................................... 425/29; 425/144; 425/157; 425/160; 425/162
[58] Field of Search ........................................... 425/29

[56] References Cited

U.S. PATENT DOCUMENTS

| | | | |
|---|---|---|---|
| 3,718,721 | 2/1973 | Gould et al. | 425/29 X |
| 3,819,915 | 6/1974 | Smith | 425/29 X |
| 3,980,743 | 9/1976 | Smith | 425/29 X |
| 4,022,555 | 5/1977 | Smith | 425/29 |
| 4,044,600 | 8/1977 | Claxton et al. | 425/29 X |

Primary Examiner—J. Howard Flint, Jr.
Attorney, Agent, or Firm—Hamilton, Renner & Kenner

[57] ABSTRACT

A method and apparatus is disclosed for injecting a temperature sensitive probe into a tire to be cured in a mold which is at least in part heated by a steam cavity. The probe is utilized to monitor cure conditions and provides an electronic input signal to control the cure. The probe is carried by a movable member in a housing mounted in the mold with one side of the movable member being exposed to, and thereby worked on, the steam in the cavity so that the steam pressure itself is utilized to inject the probe.

11 Claims, 2 Drawing Figures

PROBE INJECTION SYSTEM FOR A TIRE CURING PROCESS

BACKGROUND OF THE INVENTION

This invention relates to an apparatus for injecting a temperature sensitive probe into a tire to be cured. More particularly, this invention relates to such a probe injection system in a tire curing press of the type wherein the mold is heated by steam in a cavity surrounding the mold.

At one time the curing or vulcanization of pneumatic tires has been controlled purely as a function of time; that is, the time a tire had to be heated to be satisfactorily cured and the temperature of the cure were empirically determined based on the particular rubber compound, size of the tire and other like factors. While such a time cure control proved satisfactory for years, it was recognized that not every tire in a batch is the same nor are the heating characteristics of a tire press the same from cure to cure. Thus, when an arbitrary time for all cures of a particular type of tire was selected, some were overcured while others undercured. Such unprecise curing not only resulted in tires of lesser grade, and sometimes scrap, but it also represented a wasting of valuable time of the capital equipment — the tire curing press.

The first attempts to optimize the cure of a tire utilized a system whereby the temperature at the boundaries of the tire, that is, at the mold surface and internally of the tire, were measured and recorded during the cure. Then the critical temperature, that is, the temperature internally of the tire, was calculated by use of known heat transfer characteristics of the tire. An example of such a system is shown in Davis, et al. U.S. Pat. No. 3,649,729. This attempt to calculate rather than measure the temperature internally of the tire resulted in inaccuracies at least equivalent to those of a pure time control, described hereinabove, primarily due to the inponderables involved in the constantly changing heat transfer characteristics.

Gould, et al. U.S. Pat. No. 3,718,721 represents the next attempt at optimizing the cure of a pneumatic tire. There, a temperature sensing probe, such as a thermocouple, was permanently mounted in the tire mold with the closing of the mold and shaping of the tire injecting the probe into the tire. It was the theory in this instance to overcome the problems of the boundary sensors by obtaining temperature data right at the site internally of the tire. The problem with this system was that the fixed probe had to withstand the forces of loading and shaping the uncured tire and unloading the cured tire. To do so, a fairly heavy gauge probe was required. Such a probe was susceptible to false temperature readings in that mold heat was conducted by the probe body to the probe sensor. Smaller probes were less susceptible to such inaccuracies but were often damaged by the curing forces previously described.

The most recent and only really successful efforts in obtaining true data internally of a tire and thereafter controlling the cure of the tire is found in the disclosures of Smith U.S. Pat. Nos. 3,819,915; 3,980,743; and 4,022,555. According to these concepts, a temperature sensitive probe, preferably a thermistor, is injected into the tire after the mold has been closed and the tire shaped. Most often a double-acting air cylinder is utilized to inject and withdraw the probe. Such operation is entirely satisfactory for use with vulcanizing molds heated by conventional platens in that there is access to the outside of the molds for mounting the air cylinder and enough clearance for operating the cylinder. However, many larger tires are cured in a press wherein the molds are encased in a "steam dome" or cavity which receives steam under pressure. In this instance space limitations often create a problem in that because of the larger tires with attendant longer cylinder stroke for deeper probe injection, it is often difficult to mount the cylinder with suitable clearances within the steam dome, as is required in order to have access to the mold. In addition, mounting such a double-acting cylinder in the steam dome exposes the same to the environment of 100 psi saturated steam thereby requiring the use of an expensive, well-sealed cylinder. Finally, using a double-acting cylinder in a steam dome press required two access holes in the steam dome with attendant heavy seals for the air supply hoses which gives rise to higher installation and maintenance costs.

SUMMARY OF THE INVENTION

It is therefore a primary object of the present invention to provide a system for injecting and retracting a temperature sensitive probe into and out of a tire in a steam dome type vulcanizing press.

It is another object of the present invention to provide a system, as above, which utilizes the steam in the steam dome, which might otherwise have deleterious effects, to an advantage for injection of the probe into the tire.

It is a further object of the present invention to provide a system, as above, in which a double-acting cylinder is not needed to inject the probe, thereby rendering the injection assembly more readily suitable for mounting within the steam dome.

It is yet another object of the present invention to provide a system, as above, which includes a cylinder stroke adjustment feature mounted inside the cylinder and thereby protected from the steam environment.

It is an additional object of the present invention to provide a system, as above, which requires less installation and maintenance time and is therefore more economically justifiable than the prior art.

These and other objects of the present invention, which will become apparent from the description of the preferred embodiments, are accomplished by the means hereinafter described and claimed.

In general, the system for injecting a temperature sensitive probe into a tire being cured in a press of the steam dome type includes a cylinder housing mounted in the tire mold. A movable member in the housing carries a probe assembly including the temperature sensitive probe. One side of the movable member is exposed to the steam dome so that upon introduction of steam therein, the probe is injected into the tire. An enclosed chamber in the housing receives fluid under pressure to retract the probe out of the tire.

DESCRIPTION OF THE PREFERRED EMBODIMENTS

Figure 1:
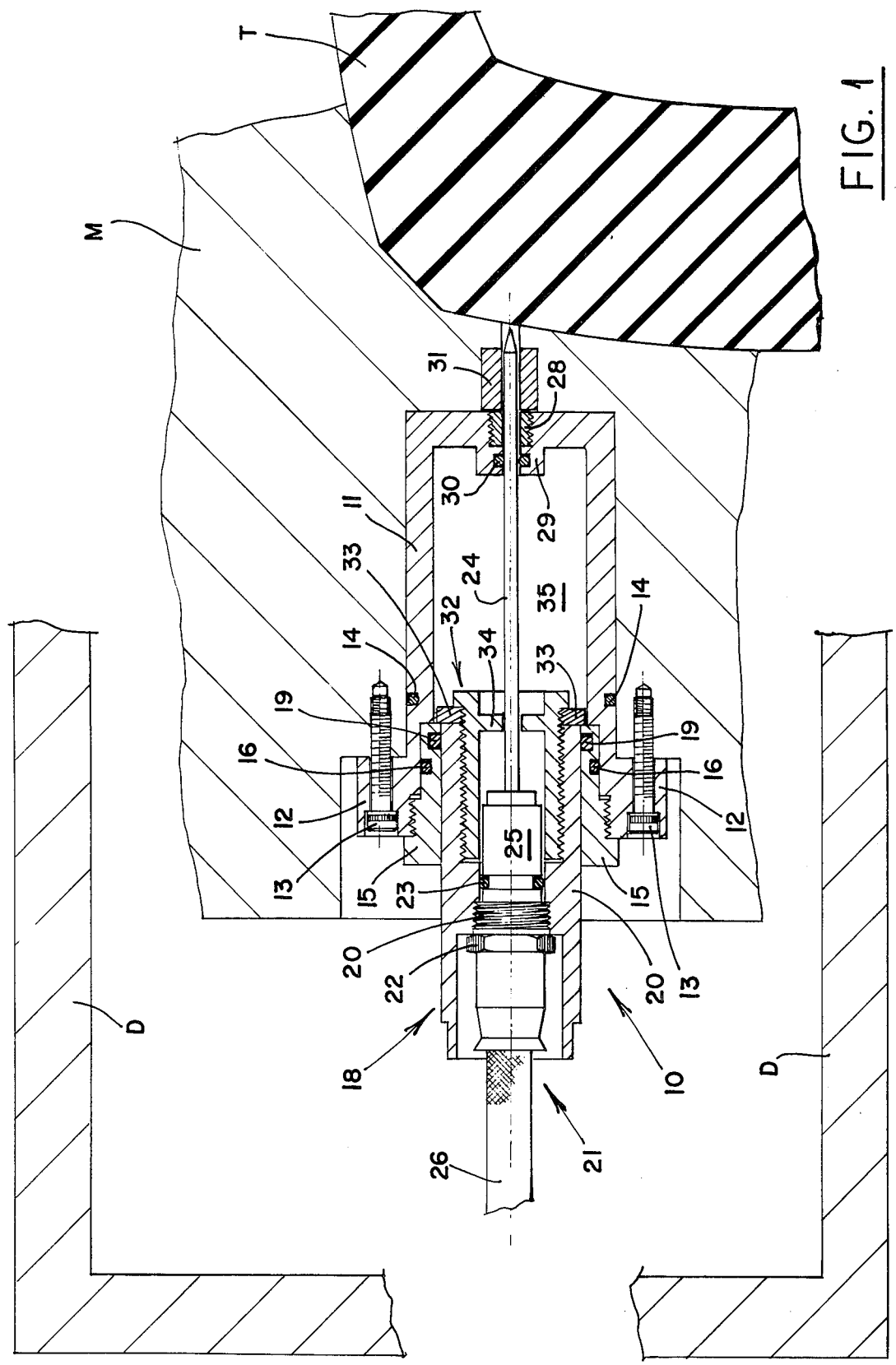
FIG. 1 is a sectional view of one embodiment of the system according to the present invention showing a tire, mold and steam dome or cavity somewhat schematically; and, FIG. 2 is a sectional view of another embodiment of the system according to the present invention showing a tire, mold and steam dome or cavity somewhat schematically.

An assembly for injecting a probe into a tire T is indicated generally by the numeral 10 in FIG. 1. Tire T is shown in a mold M with the mold being surrounded by an enclosed steam dome D which forms a cavity that receives steam under pressure to heat the mold M. Mold M is recessed to receive a generally cylindrical housing 11 which includes an annular flange 12. A plurality of fasteners 13 extend through flange 12 and into the mold to hold housing 11 in place, with an O-ring seal 14 being provided between housing 11 and the mold.

A portion of an internal diameter of flange 12 is threaded to receive a bearing gland 15 with O-ring 16 providing a seal between housing 11 and gland 15. A hollow cylindrical-like movable member or piston, indicated generally by the numeral 18, is slidably received within gland 15 with O-ring 19 providing a seal therebetween. Piston 18 is formed with an internally projecting annular hub-like portion 20 which is threaded to receive and carry a probe assembly, indicated generally by the numeral 21, which is locked in place by nut 22 so that it will move with piston 18. An O-ring provides a seal between probe assembly 21 and hub 20. Probe assembly 21 includes the temperature sensitive probe 24, itself, which is preferably a thermistor, but which may be any temperature sensitive device, a body portion 25, and a conduit 26 extending from the rear of body portion 25 and through steam dome D with appropriate seals, not shown. Conduit 26 thus carries the electrical signal out of the steam dome and, as will hereinafter be described, also enables a fluid input to pass into housing 11 for retracting the probe. The electronic signal from probe assembly 21 may thereafter be utilized by an electronic control device, such as that shown in Smith U.S. Pat. No. 4,022,555, to which reference is made for whatever details are necessary to fully understand this invention, and the vulcanization of the tire is thereby controlled based on the temperature data sensed by probe 24. Housing 11 is provided with a bearing gland 28 and embossment 29 through which probe 24 extends with an appropriate O-ring seal 30. Probe 24 also extends through an insulating sleeve 31 in mold M which prevents the probe from picking up extraneous heat from the mold.

A cylindrical stroke adjustment screw, indicated generally by the numeral 32 is adjustably threaded into piston 18 so as to be positioned with respect to piston 18 at varying locations. A lock nut 33 threads onto adjusting screw 32 so that once it is properly positioned with respect to piston 18, lock nut 33 can be tightened to hold screw 32 in place. As shown in FIG. 1, screw 32 is in a position to allow piston 18 to move its full stroke before screw 32 bottoms out against the end wall of housing 11. Adjusting screw 32 is also provided with a plurality of centering lugs 34 through which the body of probe 24 centrally passes.

The operation of the device of FIG. 1 should now be evident. Usually it is desirable to insert probe 24 into the point of slowest cure of the tire usually located within the thick shoulder portion of the tire T. With that depth being known, adjusting screw 32 is set and locked accordingly by merely removing bearing gland 15 for access to screw 32. Fluid pressure, usually in the form of air from a pneumatic source (not shown) is then introduced through conduit 26. The body portion 25 of probe assembly 21 is provided with an aperture which permits the air pressure to pass into chamber 35 within housing 11 thereby assuring that the tip of probe 24 is fully retracted by acting on the exposed surfaces of piston 18. The tire is then loaded in the mold and the mold closed. Shortly after this time steam is admitted into steam dome D to initiate heating the mold. Although the injection of the probe could be essentially simultaneous with the admission of steam to the steam dome, usually after a predetermined small time delay the air is exhausted out of chamber 35 enabling the steam pressure to act on the exposed surfaces of piston 18 to inject probe 24 into tire T to the depth determined by adjusting screw 32. The probe may now obtain temperature data from the shoulder portion of the tire and transmit the same for cure control purposes. Near the end of the curing process the steam is released and thereafter, prior to opening the mold and removing the tire, chamber 35 may again be pressurized to retract the probe. The system would then stand ready for another cure cycle.

Figure 2:
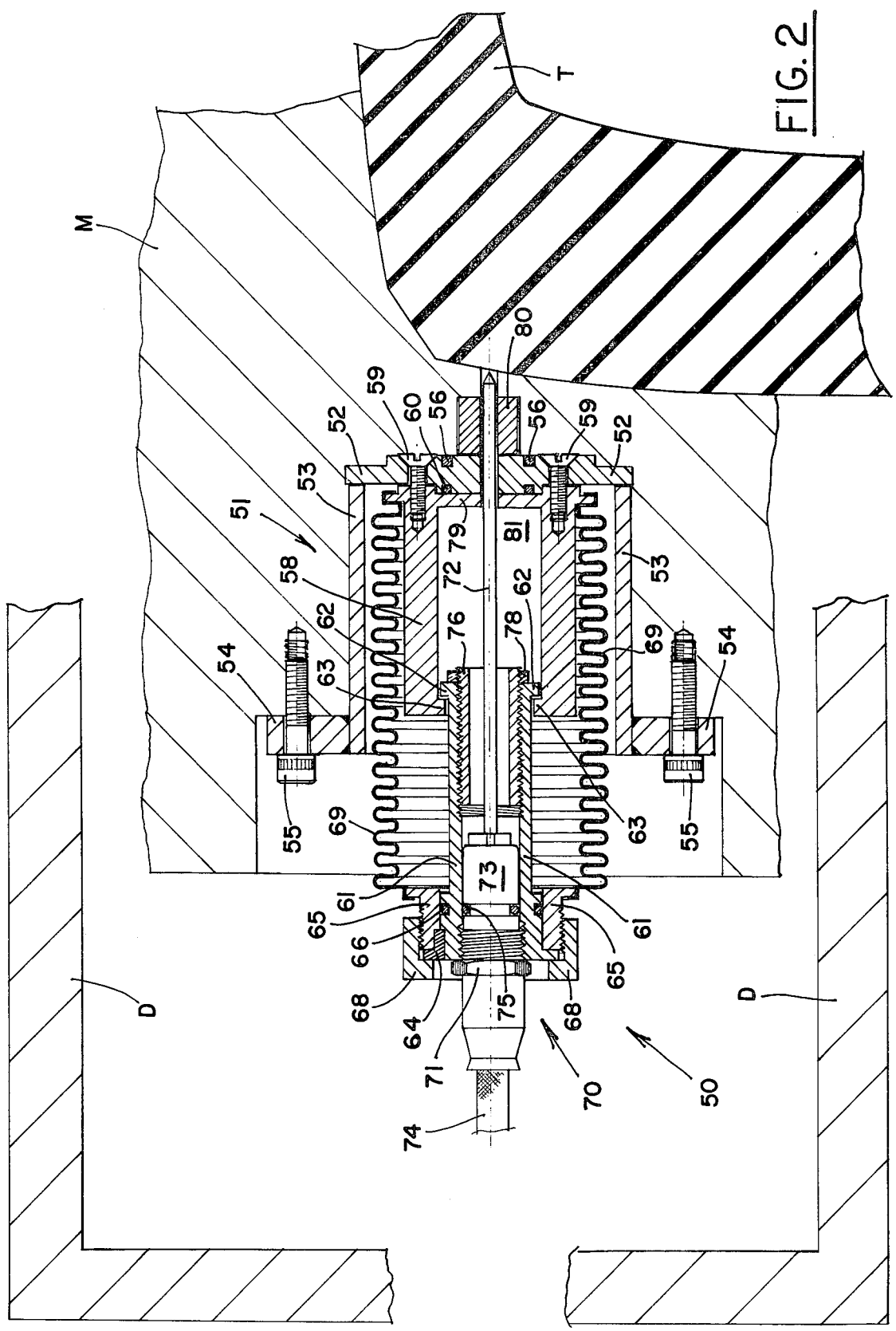

An alternate assembly for injecting a probe into a tire T is indicated generally by the numeral 50 in FIG. 2. As in the FIG. 1 embodiment, tire T is somewhat schematically shown in a mold M which is surrounded by a steam dome D. Mold M is recessed to receive a housing or guide, indicated generally by the numeral 51, and including a circular back plate 52, a cylindrical member 53 bearing against back plate 52, and an annular flange 54 welded to cylindrical member 53. Housing 51 is fastened to mold M by a plurality of screws 55 extending through flange 54. O-ring 56 provides a seal between back plate 52 and mold M.

Prior to affixing housing 51 to mold M, a stationary cylinder head 58 is affixed to back plate 52, as by screws 59, with O-ring seal 60 therebetween. A hollow cylindrical-like movable member or piston, indicated generally by the numeral 61, is slidably received within head 58. The axially inner portion of piston 61 includes an interrupted flange formed of four segments 62 each extending approximately 45° of the circumference. The axially outer portion of head 58 has an interrupted flange of four similar segments 63 so that piston 61 may be inserted in head 58 by misaligning segments 62 with segments 63. Then a 45° rotation of piston 61 will cause the segments to interfere. The axially outer end of piston 61 is provided with a keyway to receive a key 64 to affix piston 61 to a movable head 65. An O-ring 66 is provided between piston 61 and head 65. Key 64 is oriented such that segments 62 and 63 will be maintained interfering when locked in place. A clamp ring 68 is threaded onto movable head 65 and effectively holds all the movable members in place within housing 51 and stationary head 65. A metallic bellows 69 is attached, as by soldering, to stationary head 58 and movable head 65 provides an effective area upon which the steam dome pressure acts to provide the driving force for probe insertion and effectively seals the operating mechanisms of the present invention to isolate the same from the steam in steam dome D.

Piston 61 is internally threaded at its axially outer end to receive and carry a probe assembly indicated generally by the numeral 70 and substantially identical to probe assembly 21 of FIG. 1. Probe assembly 70 is locked to piston 61 by nut 71 and includes a temperature sensitive probe 72, a body portion 73, and a conduit 74 which extends through steam dome D with appropriate seals, not shown. Conduit 74 thus carries the electrical signal out of the steam dome for processing, as previously described with respect to the FIG. 1 embodiment and also provides a fluid input for head 58 and the interior of bellows 69. An O-ring seal 75 is provided between body portion 73 of probe 71 and piston 61.

A cylindrical stroke adjustment screw 76 is adjustably threaded into the axially inner end of piston 61 so as to be positioned with respect to piston 61 at varying locations. A lock nut 78 also threads onto screw 76 so that once it is properly positioned with respect to piston 61, lock nut 78 can be tightened to hold screw 76 in place. As shown in FIG. 2, screw 76 is in a position to allow piston 76 to move its full stroke before bottoming out against stationary head 58. As the piston does move, probe 72 passes through the apertured end 79 of head 58, through an insulating sleeve 80 in mold M and on into tire T.

The operation of the FIG. 2 embodiment is substantially identical to that of FIG. 1 and will be only summarized herein. Adjusting screw 76 may be set for proper probe insertion depth by removing clamp ring 68 for access thereto. Fluid pressure is introduced through conduit 74 and through an aperture in body portion 73 of probe assembly 70 to pressurize chamber 81 within stationary head 58 and bellows 69, to fully retract the probe and expand bellows 69 to the position shown. Introduction of steam into dome D and exhaustion of the fluid in chamber 81 enables the steam pressure to work essentially on the effective area of the bellows and other external surfaces to inject the probe.

It should thus be evident that a probe injection system constructed and operated according to either embodiment disclosed herein will accomplish the objects of the present invention and otherwise substantially improve the cure control art.

We claim:

1. Apparatus for injecting a temperature sensitive probe into the rubber compound of a tire to be vulcanized in a mold, the mold being heated at least in part by pressurized steam in a cavity adjacent the mold comprising, a housing mounted in the mold, a probe assembly including the temperature sensitive probe, movable means in the housing and carrying said probe assembly, and an enclosed chamber within said housing to receive fluid under pressure therein acting on said movable means to maintain the probe out of the tire, said movable means communicating with the cavity so that steam introduced into the cavity acts on said movable means to extend the probe into the tire.

2. Apparatus according to claim 1 further comprising means to adjust the amount of movement of said movable means.

3. Apparatus according to claim 2 wherein said means to adjust is carried by said movable means and positionable relative to said movable means at variable locations.

4. Apparatus according to claim 3 further comprising lock means to maintain the relative position between said means to adjust and said movable means.

5. Apparatus according to claim 1 further comprising means to permit removal of said probe assembly and said movable means from within said housing.

6. Apparatus according to claim 1 further comprising insulation means in the mold, said probe being received within said insulation means.

7. Apparatus according to claim 1 wherein said probe assembly includes means to provide fluid under pressure to said chamber.

8. Apparatus according to claim 1 wherein said chamber is defined by said movable means and said housing.

9. Apparatus according to claim 1 further comprising stationary head means attached to and within said housing, said chamber being defined in part by said movable means and said stationary head means.

10. Apparatus according to claim 9 further comprising movable head means movable with said movable means, and bellows means extending from said movable means to said stationary head means to provide a seal for said movable means and said chamber.

11. Apparatus according to claim 9 wherein said stationary head means includes an interrupted flange and said movable means includes an interrupted flange, said interrupted flanges being engageable so that said movable means fits within said stationary means.

* * * * *